United States Patent [19]

Menon et al.

[11] Patent Number: 5,060,142
[45] Date of Patent: Oct. 22, 1991

[54] SYSTEM WHICH MATCHES A RECEIVED SEQUENCE OF CHANNEL COMMANDS TO SEQUENCE DEFINING RULES FOR PREDICTIVELY OPTIMIZING PERIPHERAL SUBSYSTEM OPERATIONS

[76] Inventors: Moothedath J. Menon, 6017 Montoro Dr., San Jose, Calif. 95120; Dickie K. Woo, 736 Homer Ave., Palo Alto, Calif. 94301

[21] Appl. No.: 197,056

[22] Filed: May 20, 1988

[51] Int. Cl.$^5$ ............................................. G06F 13/14
[52] U.S. Cl. ................................. 364/200; 364/241.9; 364/274.5; 364/274.3; 364/274.7
[58] Field of Search ... 364/200 MS File, 900 MS File

[56] References Cited

U.S. PATENT DOCUMENTS

| | | | |
|---|---|---|---|
| 4,536,836 | 8/1985 | Dodd et al. | 364/200 |
| 4,574,346 | 3/1986 | Hartung | 364/200 |
| 4,837,688 | 6/1989 | Cronauer | 364/200 |
| 4,876,642 | 10/1989 | Gibson | 364/200 |
| 4,882,642 | 11/1989 | Taylor | 364/900 |
| 4,888,690 | 12/1989 | Huber | 364/200 |
| 4,888,691 | 12/1989 | George | 364/200 |
| 4,978,944 | 12/1990 | Andros | 340/825.44 |

OTHER PUBLICATIONS

Prolog Programming for Artificial Intelligence, pp. 390–394 by Ivan Bratko; 1986, Addison Wesley Pub.
Advances In Rete Pattern Matching, Science; pp. 226–232 by Schor, Marshall I. et al.
Programming Expert Systems in OPS5 by Brownstone, Lee; pp. 228–239.
Rete: A Fast Algorithm For Many Pattern/Many Object Pattern Match Problem by Forgy, Charles L.; 1982, Artificial Intelligence; pp. 17–37.

Primary Examiner—Thomas C. Lee
Assistant Examiner—Eric Coleman
Attorney, Agent, or Firm—Herb Somermeyer

[57] ABSTRACT

A state of operation is established in accordance with rules for a peripheral subsystem which enables reduced channel time for executing ensuing related channel commands of the same channel program. In a peripheral data-storage subsystem, a set of rules of operation are established. Each rule sets forth a predetermined set of sequences of channel commands during any chain of channel commands (channel program) which predict ensuing channel operations in channel program currently being executed. Once any rule is satisfied, a state of operation is established in the subsystem for responding to ensuing channel commands in the same channel program and which relate to the channel commands set forth in the rules. So long as such related ensuing channel commands continue or until the end of the channel program the state of operation is maintained in the subsystem. During the state of operation, responding to the ensuing commands is speeded by performing preparatory subsystem operations before executing the ensuing channel commands. In a search for a desired record function, the state of operation causes data to be next searched to be staged to an electronic buffer such that the ensuing channel commands are executed at electronic speeds rather than related to the latency time of disk recorders.

8 Claims, 1 Drawing Sheet

SYSTEM WHICH MATCHES A RECEIVED SEQUENCE OF CHANNEL COMMANDS TO SEQUENCE DEFINING RULES FOR PREDICTIVELY OPTIMIZING PERIPHERAL SUBSYSTEM OPERATIONS

FIELD OF THE INVENTION

The present invention relates to peripheral data-processing systems, including peripheral data-storage subsystems attachable to host processors and including disk data-storage devices; and more particularly to rule based modifications to the usual operations of such peripheral subsystems.

BACKGROUND OF THE INVENTION

Peripheral data-storage subsystems which include direct access storage devices (DASD—disk recorders and reproducers) attach via I/O channels to one or more host processors. Programs executing in the host processor(s) access the DASD for recording and retrieving data. In many instances such programs search for data to be retrieved or updated by matching record identifications or record keys with such identifications or keys recorded in the DASD. In other words, particular records within a data set recorded on the DASD are being sought. For example, each DASD includes a volume table of contents (VTOC) which indexes the data stored on the respective DASD. Channel programs executing in the host processors can consume one-third of available channel time while doing a VTOC search for Allocate, Scratch and Open. Such searching is synchronously related to disk rotations which are measured in milliseconds. Such relatively extended search times reduces channel availability and hence degrades the rates of I/O operations related to such channels. It is desired to reduce the channel and host processor execution in such searching and other channel oriented peripheral operations. It is preferred if such channel utilization enhancement could be achieved in the peripheral subsystem.

DISCUSSION OF PRIOR ART

In tailoring subsystem operations to host processor program execution, many systems employ "hints" received from the host processor as a part of the execution of a channel program. Such hints are really indications to the subsystem as to how best to respond to the ensuing channel commands within the current channel program. Hartung, in U.S. Pat. No. 4,574,346, shows such a system regarding management of a cache system. It is not always practical to use such hints. One reason is that there is a plethora of existing application programs, each of which could use different input-output characteristics for maximizing host processor throughput and minimize channel utilization. When some input-output characteristics are similar for a relatively large number of such application programs, it can be useful and less expensive to employ techniques in the peripheral subsystem for accommodating such input-output characteristics for minimizing channel utilization (therefore enhance total channel performance and increase host processor throughput).

One example of attempting to use machine-implemented procedures in a peripheral subsystem to enhance input-output operations is shown by Dodd et al in U.S. Pat. No. 4,536,836. Here the premise is that different volumes of data (disk packs or devices having fixed record disks) contain mostly data of the same type, i.e. either sequential data sets or random data sets. Dodd et al teach that during the execution of a channel program the sequence of channel commands is monitored and recorded. Then at the conclusion of a channel program at the peripheral subsystem, it is determined whether the data set processed in the monitored channel program is random or sequential. Absence of SEEK commands were used as an indication of the volume storing sequential data sets. The distribution of sequential and random data sets occurring in various data storing volumes of disk type storage is usually not known. Of course, it can be safely assumed that magnetic tape stored data sets are sequential. The Dodd et al analysis does not apply to analyzing a sequence of channel commands within a channel program for predicting the sequence of ensuing channel commands within the channel program for reducing channel usage time by that executing channel program. A sequence of channel commands can exhibit diverse requirements which maximize channel utilization, therefore it is desired to provide a prediction of channel operation from within a currently executing channel program.

SUMMARY OF THE INVENTION

It is an object of the present invention to enhance channel utilization by predictive rules embodied into the operation of the peripheral subsystem.

In accordance with the invention the peripheral subsystem analyzes the character of channel commands received from an attached channel for predicting subsequent channel related operations within the same channel program. The prediction initiates independent subsystem operations which reduce channel usage in subsequently received channel commands within the same channel program. In particular, predetermined sequences of selected channel commands and associated parameter data are matched to a set of rules established for the subsystem. If there is no match between the examined sequence of channel commands and any rule in the set, the prediction process is reset to start over. Whenever a match between the examined sequence and any rule in the established set is successful, operations of the subsystem are changed to effect a prediction of ensuing channel commands. In one embodiment, data are staged to an electronic buffer for reducing subsystem response times to search instituting channel commands.

The foregoing and other objects, features, and advantages of the invention will be apparent from the following more particular description of preferred embodiments of the invention, as illustrated in the accompanying drawings.

DETAILED DESCRIPTION

Figure 1:
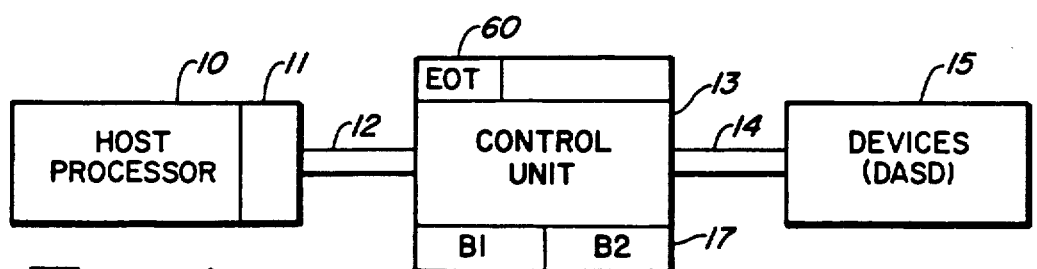
FIG. 1 is a simplified block diagram of a host processor attaching a peripheral subsystem.

Host processor 10 having input-output channel processor 11 attaches a peripheral subsystem via channel 12. The peripheral subsystems includes programmable control unit 13 in which the present invention is preferably embodied in programmed form. Control unit 13 in turn, via subsystem internal connection 14, connects to one or more peripheral devices 15. In a constructed embodiment of the invention the devices 15 were IBM 3330 disk files (recorders/reproducers) using the count, key, data (CKD) format for recording data sets as a series of records on the respective recording surfaces of the plural disks in the 3330. Random accessing of records of a given data set recorded in the 3330 may involve examining the count fields by the known channel command SEARCH ID for identifying a record by the record identification, hereafter number, stored in the count field. Other information stored in the count field includes physical location of the record on the 3330. Another channel command for finding a record or records is by using the SEARCH KEY command for examining the key field. The key field contains key parameter data for facilitating quick identification of records of a data set stored on DASD. A sequence of such SEARCH commands indicate that ensuing channel commands could well be similar or related SEARCH commands. Such sequences are often termed "CCW sequences" after the channel programs in the host processor which comprise a sequence of channel command words (CCW's) in the host processor main storage but executed by channel processor 11. In accordance with the invention, when the peripheral subsystem detects later described sequences, it alters the state of operation of the subsystem, including disconnecting from the channel (as by a channel command retry signal sent to channel processor 11) and stages data records from the device 15 into a electronic random access buffer 17 of control unit 13. Then, after the appropriate records are in buffer 17, control unit 13 sends a device end (DE) signal to channel processor 11 signalling that the peripheral subsystem is prepared to continue with the current chain of channel commands. The search operation then resumes at electronic speeds by examining the records stored in the control unit 13 buffer 17. The search operation is again halted when the last buffered record has been examined; this action is followed by staging more records to be searched from DASD 15 to buffer 17. It is to be appreciated that the searching at electronic speeds in buffer 17 can be overlapped with staging records from DASD 15 to buffer 17 in anticipation of continued search operations within the current chain of commands (current channel program). Chaining channel commands on IBM built host processors is well known and not described for that reason. Upon resuming execution of the chain of CCW's by a sequence of channel commands, the search is executed out of buffer 17 at electronic speeds rather than out of device 15 at its rotational speed. Receipt of channel commands, decoding received channel commands and the subsequent execution thereof is well known; therefore it is not be repeated here.

Figure 2:
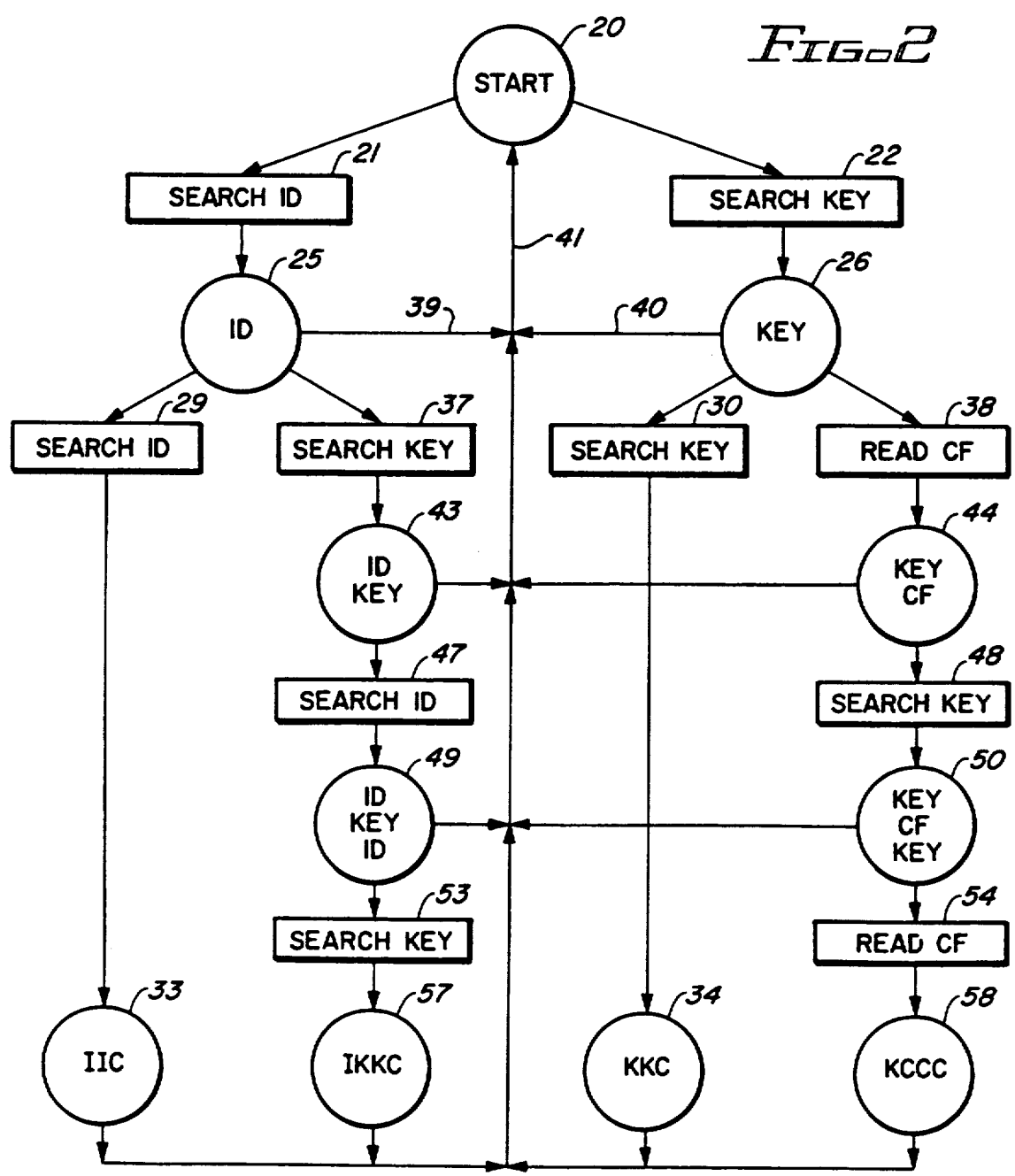
FIG. 2 is a state diagram of the FIG. 1 shown subsystem which illustrates the present invention.

FIG. 2 illustrates some operational states of the peripheral subsystem which embody a set of preferred rules for managing subsystem operations. Start state 20 is the subsystem state of operation which executes channel commands in the usual manner. Each received channel command received by control unit 13 from channel processor 11 is not only decoded and executed, but also is examined to determine if any received channel command in any chain of such commands is either a SEARCH ID or SEARCH KEY channel command, respectively 21 and 22. If either type of command is received, the peripheral subsystem goes to one of two rule examination states ID 25 or KEY 26. The SEARCH ID can be a SEARCH ID Equal, High or Equal/High channel command. The SEARCH KEY can be a SEARCH KEY Equal, High or Equal/High channel command. Such received SEARCH channel commands along with their arguments (parameter data) are stored in a work area (not shown) of control unit 13. The very next received channel command from channel processor 11 can cause the rule not be satisfied, be satisfied or additional rule matching may be required. When the very next received channel command has an identity with the SEARCH ID or SEARCH KEY channel command with identical arguments, as respectively indicated by numerals 29 and 30, then control unit 13 predicts by satisfaction of the first or third rules, respectively, that the current channel program (such continuing program is indicated to control unit 13 by a "chaining" signal supplied by channel processor 11 to control unit 13) is searching for a record identified in a count field having a record number that is equal to or greater than the ID supplied with the SEARCH ID channel commands 21 and 29. In the case of the third rule, control unit 13 predicts that the current channel program is looking for a record in the data set that has a KEY value equal to or greater than the KEY value contained in the SEARCH KEY channel commands 22 and 30. The satisfaction of the first and third rules is indicated by control unit 13 entering the IIC (ID=ID rule Confirmed) state 33 or the KKC (KEY=KEY rule Confirmed) state 34, respectively.

If control unit 13 when in the ID state 25 next receives SEARCH KEY channel command 37 from channel processor 11 in the current chain of commands, then the second rule could be invoked as described later. Similarly, when control unit 13 is in the KEY state 26 and receives a READ CF (read the count field) channel command 38 from channel processor 11 during the current chain of channel commands, then the fourth rule is to be used in examining subsequently received channel commands. When in either state ID 25 or KEY 26, control unit 13 receives a channel command other than any of the channel commands 29, 30, 37 or 38 none of the first through fourth rules can be satisfied; then control unit 13 returns to start state 20 resetting all rule examinations to date, as indicated by arrows 39 and 40 which join at arrow 41 leading to state 20. Control unit 13 in continuing using the second and fourth rules changes from either state ID 25 or KEY 26 respectively to states ID KEY 43 or KEY CF 44.

Control unit 13 when in ID KEY state 43 looks for the very next channel command to be a SEARCH ID channel command having the same record argument received with channel command 21 immediately followed by a next received channel command which is identical to channel command 37 and has the same argument. In FIG. 2, this sequence is represented as SEARCH ID channel command 47, ID KEY ID state 49, channel command SEARCH KEY 53 leading control unit to the IKKC (ID=ID; KEY=KEY rule Confirmed) state 57. When the second rule is satisfied as indicated by the IKKC state 57, control unit 13 predicts that the current channel program being executed in channel processor 11 is searching for a record having a record number which is not equal to, not greater than, or not greater than equal to the ID data parameter of the SEARCH ID channel commands 21 and 47 AND that the key field of the record is either equal to, greater than or greater than equal to the KEY parameter of the SEARCH KEY channel commands 37 and 53. Note that the comparatives equal, greater than or greater than equal derive from the channel command modifiers indicating the identical comparative functions, respectively. That is the equal comparative function is used when the received channel commands have the equal comparative function, etc.

Similarly, from state KEY CF 44 in using the fourth rule, control unit 13 looks for successive SEARCH KEY channel command 48 immediately followed by READ CF channel command 54 which are respectively identical (in command and argument) to prior received channel commands 22 and 38. Receiving channel command 48 drives control unit 13 from state KEY CF 44 to state KEY CF KEY 50, thence to KCCC (KEY=KEY, CF=CF, rule Confirmed) state 58. Control unit 13 in detecting satisfaction of the fourth rule at state KCCC 58 predicts that the ensuing channel commands of the current chain of commands will result from channel processor 11 executing a channel program which is searching for and wanting to read the count field CF of a record stored in DASD 15 which has a key field entry equal to, greater than or greater than equal to the key parameter in channel commands 22 and 48.

When in any of the machine states 43, 44, 49 or 50, if any channel command other than the channel commands 47, 48, 53 or 54 are received by control unit 13 from channel processor 11 or if the channel commands 47, 48, 53, or 54 are received with an incorrect parameter (command modifier or argument), control unit 13 returns to start state 20 resetting rule examination. This return is indicated by the respective unnumbered arrows respectively extending from the state symbols 43, 44, 49 or 50 to state return arrow 41. Return to start state 20 from any of the confirmed states 33, 34, 57 or 58 occurs either at the end of the channel program currently being executed (such as indicated by channel processor 11 removing chaining) whenever a received channel command is not a search related command, such as a SEEK command. When in any of the confirmed states, the subsystem is said to be in a state of operation which predicts the ensuing operations to be commanded by channel processor 11 when executing the current channel program. Such state of operation is not carried over into any later executed channel programs.

In any of the four rule confirmed states 33, 34, 57 or 58, control unit 13 executes the below listed machine operations which are a departure from normal response to the received channel commands of the current chain of commands. The departure from normal execution includes alternately staging later described records of the data set being searched from DASD 15 to electronic buffer 17 while disconnected from channel processor 11 and then reconnecting to channel processor 11 for searching the buffered records for the search criteria to find the desired records. Such off line staging (which can be overlapped with the buffer searching) is enabled by the control unit 13 rule based predicted searching operations of channel processor 11.

For purposes of description, assume that the next record of the data set to be searched is NR and that buffer 17 has two buffer portions B1 and B2. Each portion B1 and B2 can store data records storable on one track of DASD 15.

FLOWCHART OF CONFIRMED SUBSYSTEM OPERATIONS

1. Disconnect from channel (send a channel command retry to channel processor 11 indicating that the subsystem has to do certain actions before it can proceed with execution of channel commands in the current chain of commands).

2. Set up to use B1 as the current buffer; set end of track indicator EOT 60 to zero (not at EOT).

3. Stage records of the data set from device 15 into the current buffer B1 starting with NR and extending to EOT.

4. (note that this step is reentered from higher numbered steps) Search for the desired record (of the current search by channel processor 11) in the staged records in the current buffer (which can be B1 or B2 as will become apparent) starting with NR. IF EOT=1 (EOT was passed as detected in a higher numbered step) and NR is searched, set in control unit 13 CE=1 (channel end signal); DE=1 (device end signal) and UC=1 (unit check or error signal indicating no record is found that is the desired record) and return to start state 20. Then leave this flowchart.

5. IF EOT is reached in the current buffer (B1 or B2), go to step 8, else IF desired record is found in the current buffer go to step 6.

6. Stop staging data set records from DASD 15 to B1. Reconnect to the channel (send DE indicating that the subsystem is now ready to proceed with the chained commands within the current channel program).

7. First execute the received channel command not performed at step 1. The received channel command is either command 29 (rule 1), 53 (rule 2), 30 (rule 3) or 54 (rule 4). Execute that command against NR in the current buffer. Receive ensuing channel commands in the chain making comparisons as indicated by the respective rule Confirmed states 33, 57, 34 or 58 on records stored in the current buffer and residing between NR and the desired record until either the desired record is found (this find results in normal ending of the chain of commands and is a successful execution of the channel program by channel processor 11 issuing the chained channel commands), or a channel command other than a SEARCH or READ CF command is received whereupon start state 20 is reassumed by control unit 13 and the subsequent execution of the chained commands is in that state.

8. Check the received control information to determine if the search is a multi-track search. IF it is a multi-track search go to 10, else go to 9.

9. Now that EOT has been reached on DASD 15, continue staging records of the data set from the first record on the track currently being accessed on DASD 15 into buffer 17. Set EOT=1 and continue searching the records beginning at the start of the current track up to NR. The staging is switched from B1 to B2 at EOT and subsequent searching occurs in B2 after EOT. Go to 4 to continue the searching in buffer 17.

10. It is a multi-track search. IF the end of the cylinder is reached (last track in the cylinder of tracks has been searched) send CE DE UC to channel processor 11. Then proceed to other machine operations. Else, set up B2 to be used and continue staging records of the data set from a next track in the cylinder of tracks of DASD 15. Make NR point to the first record stored in B2. NR2 will be used later for record searching in B2.

11. Reconnect to the channel (send DE to the channel).

12. Execute the last channel command (29, 53, 30 or 54) against NR.

13. Receive additional channel commands from the channel and proceed as in step 7. Disconnect from the channel (as in step 1) when all records of the current buffer B1 or B2 have been searched, set NR to NR2 and go to 4.

From all of the above it is seen that the simple rule examination of the chained channel commands eliminates channel connection time in the search type channel programs.

While the invention has been particularly shown and described with reference to preferred embodiments thereof, changes in form and details may be made therein without departing from the spirit and scope of the invention.

We claim:

1. In a machine-effected method of operating a peripheral data-storage subsystem having a machine-sensible data-storing medium with a large plurality of addressable data-storage locations;
   including, the machine-executed steps of:
      establishing a set of sequence defining rules for a channel program having a series of channel commands, said channel commands being in a plurality of chains of said channel commands;
      the subsystem receiving from a connected input-output channel one or more of said channel commands in each said chain of channel commands, some of said chains of channel commands including ones of said received channel commands having data record identifying parameter data for identifying to the data-storage subsystem predetermined ones of said data-storage locations;
      examining the sequence of said channel commands having said parameter data in each one of the chains of commands for any one of a predetermined set of a plurality of said channel command sequences;
      during said each chain of channel commands, attempting to match the examined sequence of said channel commands to the set of sequence defining rules;
         if no rule match between said examined sequence of channel commands and said set of sequence occurring rules is found, then resetting the examining to start anew;
         if a rule match between said examined sequence of channel commands and said set of sequence occurring rules is found, establishing a state of operation in the subsystem for effecting changes in the operation of the subsystem in responding to ensuing ones of said channel commands after said match is found and such ensuing channel commands being related to the examined channel commands; and
   such changes causing the subsystem to execute first predetermined subsystem machine operations in an unchanged mode of operation of the subsystem during the existence of said each chain of channel commands which would occur as if the subsystem were transferring data over said the channel but wherein the subsystem performs such first predetermined subsystems machine operations during said state of operation while the subsystem is disconnected from the channel and during said first predetermined machine operations the system storing data in a buffer connected to the data-storing medium during said first predetermined machine operations and wherein said ensuing channel commands in the said each chain of commands appear to the channel to be executed in the same manner using said buffer without the state of operation accessing said data storing medium but at electronic speeds including accessing said buffer whereby the usage of the channel during the chain of channel commands is reduced.

2. In the machine-effected method set forth in claim 1, further including the machine-executed steps of:
   establishing said set of sequence-defining rules to be respective sequences of SEARCH channel commands, each said SEARCH channel command including a search parameter in its respective said parameter data,
      said set of sequence-defining rules including a first rule for a predetermined sequence of two predetermined search parameters in successive ones of the SEARCH channel commands,
      said set of sequence-defining rules further including a second rule or a predetermined sequence of diverse SEARCH channel commands, each of said diverse CHANNEL commands wherein said parameter data includes predetermined diverse search parameters; and
   establishing said state of operation to continue searching in said data-storing medium by the subsystem as indicated by the respective two rules independent of any later received channel commands.

3. In the machine-effected method set forth in claim 1, further including the machine-executed steps of:
   after a rule match is found between a set of sequence-defining rules and a sequence of examined channel commands;
      alternating the subsystem operations between channel connections and channel disconnections and limiting the subsystem operations occurring at electronic speeds to the times when the subsystem is connected to the channel and accessing a peripheral device having said data-storing medium for copying data stored on said data-storing medium from the peripheral device during channel disconnections; and
   alternating the channel connection and disconnection during execution of the channel program.

4. In the machine-effected method set forth in claim 1, further including the machine-executed steps of:
   in said chain of commands, searching for a desired record using predetermined criteria received from a channel processor in SEARCH ID or in SEARCH KEY channel commands, each of said SEARCH ID and SEARCH KEY channel commands including an argument in its respective parameter data;
   in a first rule for changing the subsystem operations, detecting two successive received SEARCH ID channel commands and their respective arguments which are identical and establishing said state of operation upon matching the pattern of two successive SEARCH ID channel commands in the current chain of commands and maintaining said state of operation until the end of the chain of commands or until a channel command is received that is not a SEARCH ID related channel command;
   in a second rule of changing subsystem operations, detecting a received sequence of four successive channel commands, including a first SEARCH ID command immediately followed by a first SEARCH KEY channel command, immediately followed by a second SEARCH ID channel command and then immediately followed by a second SEARCH KEY channel command and wherein the first and second SEARCH KEY channel commands and their respective arguments are identical and said first and second SEARCH ID channel commands are identical and maintaining said state of operation until the end of the chain of commands or until a channel command is received that is not a SEARCH ID or SEARCH KEY related command for searching for a desired record;

in a third rule of changing the subsystem operations, detecting a received sequence of two identical SEARCH KEY channel commands with their identical arguments and in response to said detected received sequence of SEARCH KEY channel commands establishing said state of operation in the current chain of commands and maintaining said state of operation until the end of the chain of commands or until a channel command is received that is not a SEARCH KEY related channel command; and in a fourth rule of changing subsystem operations, detecting a received sequence of a third SEARCH KEY channel command immediately followed by a first READ CF channel command immediately followed by a fourth SEARCH KEY channel command immediately followed by a second READ CF channel command and wherein the first and second READ CF channel commands are identical and have respective identical arguments and said third and fourth SEARCH KEY channel commands and their arguments are identical, establishing said state of operation and maintaining said state of operation in the subsystem until the end of the chain of commands or until a channel command is received that is not a SEARCH KEY related channel command.

5. In the machine-effected method set forth in claim 4, wherein the subsystem has an electronic data buffer capable of storing data equal to one track of data of a peripheral data storage device having and operable with respect to said data-storing device to machine sense data stored in the data-storing medium and said track-sized buffer providing access to data stored therein which are at electronic speeds;

further including the machine executed steps of:

during said state of operation and while disconnected from the channel, copying data indicated by any one of said rule matches to be next searched by said rule in the set of rules from a peripheral data storage device to said track-sized buffer, upon completing a predetermined copy of data, reconnecting the subsystem to the channel and performing ensuing search commands against data stored in the buffer, and when the search of data stored in the buffer is completed, determining whether or not additional searching is required; then when additional searching is required, repeating the disconnection and copying followed by the buffer data searching until the desired record is found, the search is stopped or the chain of channel commands ends.

6. In a method of operating a data processing subsystem attached to a host processor via a channel processor wherein the input output operations between the subsystem and the channel processor are in chains of channel commands corresponding directly to channel programs being executed by the channel processor;

including the machine-executed steps of:

establishing a set of rules, each rule having a match pattern, in the subsystem wherein each of the established rules define predetermined sequences of channel commands within any chain of commands;

executing a given chain of channel commands in the subsystem including responding to each received channel command and monitoring sequences of said channel commands in the given chain and comparing the monitored sequences of channel commands with all of the established rules; and detecting when any rule defined pattern of a sequence of channel commands is are matched, in response to detecting matching any of said rules, initiating a state of operation in the subsystem which results in internal subsystem operations not used in responding to channel commands received by the subsystem after detecting said matching of rule to a sequence of channel commands but reducing channel utilization time used in responding to such ensuing channel commands, including disconnecting the subsystem from the channel processor and performing predetermined operations in the subsystem related to said detected matching of a rule to a sequence of channel commands, said disconnecting being a preparation for ensuing channel commands received after detecting said matching in said given chain of channel commands; upon completion of said predetermined operations which produce a predetermined result of making data available to the channel processor from the subsystem at electronic speeds, reconnecting to the channel and executing said ensuing ones of said channel commands including using the data made available at electronic speeds by said predetermined operations for to responding to said ensuing channel commands for reducing the channel time to respond because of the usage of said results.

7. In the machine-effected method set forth in claim 6, further including the machine-executed steps of:

selecting said sequence of channel commands for said rules to include search type channel commands; and after establishing said state of operation performing said disconnected channel operations interleaved with said subsystem operations on said ensuing channel commands.

8. In the machine-effected method set forth in claim 7, further including the machine-executed steps of:

aborting said state of operation whenever any of said ensuing channel commands is other than a search type command or whenever the given chain of commands terminates.

* * * * *